United States Patent [19]

Norvell

[11] Patent Number: 4,612,647

[45] Date of Patent: Sep. 16, 1986

[54] HIGH PERFORMANCE LASER AND METHOD OF MAKING SAME

[75] Inventor: Gordon S. Norvell, Agoura Hills, Calif.

[73] Assignee: Litton Systems, Inc., Beverly Hills, Calif.

[21] Appl. No.: 729,071

[22] Filed: Apr. 29, 1985

Related U.S. Application Data

[63] Continuation of Ser. No. 517,099, Jul. 25, 1983, which is a continuation-in-part of Ser. No. 453,780, Dec. 27, 1982, abandoned.

[51] Int. Cl.[4] .............................................. H01S 3/097
[52] U.S. Cl. ....................................... 372/88; 372/94; 356/350
[58] Field of Search ...................... 372/87, 88, 94, 92, 372/85; 356/350

[56] References Cited

U.S. PATENT DOCUMENTS

| 3,719,900 | 3/1973 | Hochuli | 372/87 |
| 4,007,431 | 3/1977 | Abbink et al. | 372/94 |
| 4,190,364 | 2/1980 | Ljung et al. | 356/350 |
| 4,344,706 | 8/1982 | Ljung et al. | 356/350 |
| 4,392,229 | 7/1983 | Hostetler | 372/94 |

Primary Examiner—Léon Scott, Jr.
Attorney, Agent, or Firm—E. W. Rusche

[57] ABSTRACT

Improved electrodes for a laser include hollow, shell-like members formed of material, such as glass, whose thermal coefficient closely matches that of the laser body. Thin film metallic layers coat the interiors of the electrodes assuring device performance and superior thermal qualities. Field assist bonding of the electrodes to the laser body produces an assembly of increased performance quality that is readily amenable to advantageous manufacturing processes.

7 Claims, 1 Drawing Figure

U.S. Patent    Sep. 16, 1986    4,612,647
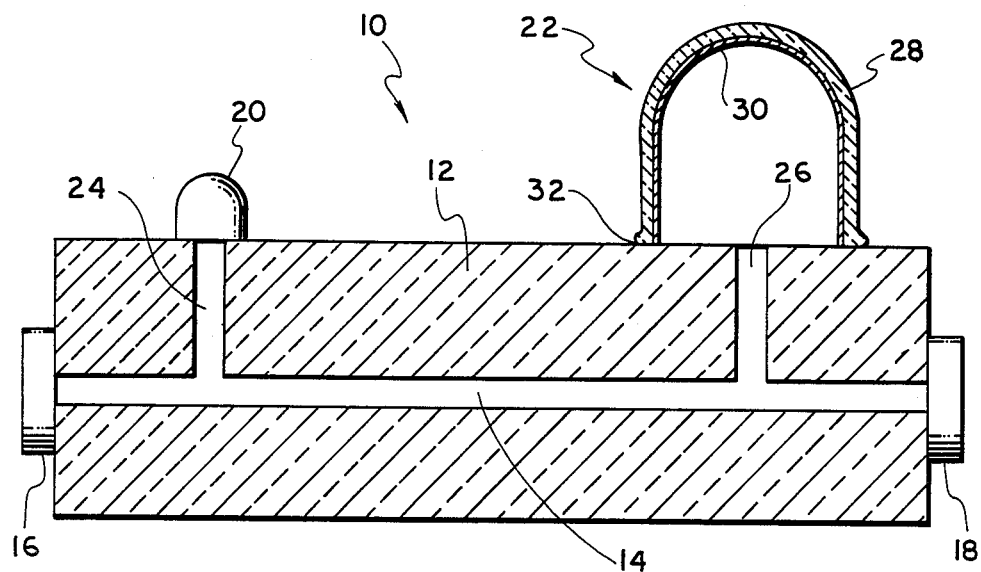

HIGH PERFORMANCE LASER AND METHOD OF MAKING SAME

BACKGROUND OF THE INVENTION

Reference to Related Application

This application is a continuation of application Ser. No. 517,099, filed July 25, 1983, which is a Continuation-In-Part of pending U.S. patent application Ser. No. 453,780 for "Improved Laser Cathode" filed Dec. 27, 1982 now abandoned.

Field of the Invention

The present invention pertains to improvements in the laser arts. More particularly, this invention relates to improved laser electrodes including an improved electrode and method of attachment thereof to a laser body.

Description of the Prior Art

In the lasing process, the laser electrodes, anode and cathode, interact to provide a flow of current through the lasing gases, exciting these gases to the higher energy states required for lasing action. Often the electrodes are situated near the ends of channels within a laser body containing appropriate gases such as helium and neon.

The cathod is commonly of a generally dome-like metallic configuration wheras a functional metallic anode may take a variety of forms, including dome or disk shaped, although its operation is less sensitive to shape than the cathode. In operation, the cathode is maintained at a negative potential and the anode is maintained at positive potential causing the cathode, bombarded by positively-charged helium and neon ions, to act as and electron emitter while the anode serves as an electron collector.

A conventional laser application, such as a ring laser gyroscope includes highly polished mirrors situated at opposed ends of the laser body. When such a laser is employed as an element of an instrumentation system only a relatively small amount of variation in the distance between the mirrors is tolerable as this distance is critical to resulting laser output. The maintenance of a preselected distance, within tolerance, poses a difficult technical problem when the laser is operated in a relatively extreme thermal environment. To combat this problem, the laser body is commonly fabricated of material of extremely low thermal coefficient, including various glass ceramics such as those known by the trademarks "Zerodur" and "Cer-Vit". The cathode and anode, on the other hand, include a metal conductor to provide a flow of current through the lasing gases. As mentioned above, aluminum and Currently, metal or metal alloy laser electrodes are produced by a number of recognized methods including stamping and machining. Such methods require extensive cleaning and preparation of the internal surfaces. Additionally, in some applications the electrodes must be sealed to the laser body. Thus a glass-to-metal seal is commonly effected in accordance with the differing compositions of the electrodes and the laser body. Indium is commonly employed as a sealing agent. Such an indium seal is disclosed in U.S. Pat. No. 4,273,282 of Norvell, et al. for "Glass-or-Ceramic-to-Metal Seals".

While electrodes of metal or metal alloy will provide the necessary electrical contact from the exterior to the interior of the laser and hence provide a means for passing the current for the lasing process, the degree of expansion they experience under thermal stress, while not degrading to the short-term operation of the laser, effects its long-term integrity. The large disparity in thermal expansion coefficients between the metal electrode and the glass ceramic laser body introduces substantial stresses into such a system. The missmatch in the coefficients of thermal expansion of aluminum and Zerodur, for example, limits the life expectancy of a seal between such an electrode and laser body when cycled, for example, between $-55°$ Centigrade and $125°$ Centigrade. the aluminum-to-glass seal, commonly including indium, is limited by indium's melting temperature of $156°$ Centigrade.

The stress introduced into a thermally stressed system including glass ceramic laser body jointed to a metallic electrode may result in distortion of the laser body by a small amount. The distortion or bending may severely degrade the performance characteristics of the laser in such applications as, for instance, the ring laser gryoscope. In addition to the physical distortion, the relative movement and cold flow of the indium sealant at the laser body-electrode interface will lead to eventual seal failure. Although 'hard' glass seals exist, they are unsuitable in light of the stress-caused differential thermal expansions. Such stresses can actually rupture the glass laser body.

The foregoing problems interact to limit the effectiveness and appropriate methods of manufacture of lasers for applications, such as ring laser gyroscopes, wherein freedom from contaminants is essential for optimum production quality and instrument performance. In the manufacture of such a precision apparatus, heat is commonly utilized to liberate volatile materials (such as water, alcohols and plastics).

Upon assembly of the ring laser gyro apparatus, including laser body, mirrors and electrodes, the instrument is placed upon a fill stand and the assembly baked to liberate undesired contaminants. This baking process, and the resultant purity of the laser, are limited in effectiveness by the 156 degree Centigrade melting point of the indium seal. (Otherwise, the assembly could be baked at an approximately 100 degree Centigrade higher temperature, limited by the capacity of the mirrors of the assembly). Thus, in addition to the harmful effects of mismatching of thermal stresses, the conventional laser assembly that includes a metallic electrode and ceramic dielectric laser body of mismatched thermal expansion coefficient joined by an indium seal is limited in effectiveness of operation and ease of manufacture.

SUMMARY OF INVENTION

The present invention overcomes the aforesaid shortcomings of the prior art by providing in a laser of the type including a dielectric body of preselected thermal expansion characteristic material and at least one electrode fixed thereto, the improvement being the electrode comprising a preselected dielectric material having a thermal expansion characteristic that closely matches the laser body, such electrode being field assist bonded to the dielectric laser body.

In a further aspect, the invention provides an improved method for manufacturing a ring laser gyroscope. The improved method comprises the steps of fabricating a laser electrode in part of preselected dielectric material having a thermal expansion characteristic that closely matches the laser body. Thereafter, the electrode is field assist bonded to the laser body. Finally, the body is baked, with the electrode fixed thereto, at a temperature in excess of 156 degrees Centigrade. Thereafter, the electrode is sealed to the laser body.

The foregoing and additional advantages and features of the invention will become apparent from the detailed description which follows. In the detailed description, reference is made to numerals indicating features of the invention in accompanying figures, like numerals referring to like features throughout.

BRIEF DESCRIPTION OF THE DRAWING

The FIGURE is a cross-sectional view of a laser in accordance with the invention.

DETAILED DESCRIPTION

Turning now to the FIGURE, there is shown a side sectional view of a laser 10 in accordance with the invention. The laser 10 includes a laser body 12, preferably formed of a ceramic glass such as Cer-Vit or Zerodur. A lasing cavity 14 resides within the laser body 12 having highly polished mirrors 16, 18 at its opposite ends. An anode 20 and a cathode 22 communicate with upright bores 24 and 26 that feed the lasing cavity 14.

The cathode 22 is generally-hemispherical, comprising an outer shell 28 of glass, quartz fused silica or glass-ceramic that includes a thin film layer 30 of aluminum or an alloy of aluminum at its interior. The shell 28 may be fabricated by any number of methods well-known in the glass and quartz forming arts including glass blowing and molding techniques. Additionally, the shell 28 can be machined from a glass ceramic such as Zerodur, Cer-Vit or the doped glass known by the trademark "ULE". Appropriate techniques for coating the interior surface of the shell 28 to form layer 30 include vacuum deposition, sputter coating and ion plating of aluminum or aluminum alloys. A cross sectional view of the anode 20 would disclose a substantially identical configuration therefor. In the instance of the anode, copper or copper alloy may form the thin film layer. Many other metals are suitable including nickel, chromium, iron, titanium, tungsten, aluminum and gold.

The inventor has found that, by employing electrodes including a shell having a coefficient of thermal expansion that closely matches that of the laser body 12, the stresses exerted upon the seals that secure the electrodes to the laser body are greatly reduced both the performance and the life of the laser are thus enhanced. He has further found that suitable metallic thin film layers do not possess sufficient mass to impose significant stresses upon the seal; thus, as long as the metallic layer is sufficiently thick to render the electrode uniformly conductive, the performance of the electrode is fully adequate and equivalent to that of an electrode solely of metal or metal alloy.

The seal 32 is preferably formed a field-assisted bonding process, such as that known as a Mallory process. In such a process, the glass electrode and laser body are heated to a temperature of 300° to 400° Centigrade while a voltage potential is applied between the electrode and the laser body. As the assembly is heated, its electrical conductivity increases, allowing electrical current to flow through the electrode-laser body interface. The current causes diffusion of the metal from the thin film layer into the glass. As a result, a strong, permanent bond is formed that is not subject to certain failure modes that characterize conventional glass-to-metal bonds including, for example, those deriving from the melting temperature of indium.

The closely matched thermal characteristics of the laser body 12, anode 20 and cathode 22 permit the use of field assisted bonding processes. Such processes result in bonds of greatly enhanced strength (thousands of p.s.i. as contrasted with indium seal strength in the hundreds of p.s.i.). As previously mentioned, the very strength of such bond can permit the transmission of destructive thermal stresses between a laser body and an electrode of differing thermal character.

When the closely matched laser body and electrode are joined by a field assist bonding process, the resultant assembly, in the instance of a ring laser gyroscope, is amenable to highy advantageous manufacturing processes that improve the quality and performance of the resultant instrument dramatically. The removal of the constraints due to thermal expansion mismatch and the relatively low melting point of the indium seal permits the assembly (including electrodes fused thereto) to be baked, in a low pressure environment, at a temperature approximately 100 Centigrade degrees higher than that of the melting point of indium. (In the instance of a ring laser gyroscope, bakeout of the instrument on the fill stand would thus be limited by the mirrors of the assembly to approximately 250 degrees Centigrade as opposed to the indium melting point of approximately 150 degrees Centigrade).

A highly desirable result of the increased bakeout temperature is its effect upon the vacuum environment. A 100 degree Centigrade increase in bakeout temperature increases material vapor pressures by more than two decades, a greater-than-one-hundred-fold increase. Since the cleaning of the assembly is a function of the differential between vapor pressure and that of the surrounding environment, it follows that one hundred times less pumping time is required to attain a given level of cleanliness. As a result, the manufacture of a laser in accordance with the invention is less expensive and its performance quality and useful lifetime are increased.

Thus it is seen that improved methods and apparatus have been brought to the laser fabrication art by the present invention. By employing the teachings of this invention, one may provide laser apparatus of increased durability for use in thermal environments that would otherwise severely degrade performance capability. Further, by employing the teachings of the invention, one may employ advantageous bonding processes not applicable to the prior art in achieving the aforesaid results. Such bonding processes, in conjunction with the configuration of the laser electrodes, provide a laser assembly of increased quality at decreased costs of manufacture.

What is claimed is:

1. In a laser of the type including a dielectric body of preselected thermal expansion characteristic material and at least one electrode fixed thereto by the method of field-assist bonding, the improvement comprising:
    (a) said at least one electrode comprising preselected dielectric material having a thermal expansion characteristic that closely matches said body; and
    (b) said at least one electrode having a metallic coating.
2. A laser as defined in claim 1 wherein:
    (a) said electrode comprises a hollow, substantially-hemispherical shape; and (b) said metallic coating is located at the interior of said substantially-hemispherical shape.

3. A laser as defined in claim 2 wherein said at least one electrode is a cathode.

4. A laser as defined in claim 3 wherein said at least one electrode additionally comprises at least one anode.

5. In a method for manufacturing a ring laser gyroscope including the steps of preparing a laser body of preselected thermal characteristic material and fixing at least one electrode thereto by the method of field-assist bonding, the improvement comprising the steps of:

(a) fabricating said electrode in part of preselected dielectric material having a thermal expansion characteristic that closely matches said body prior to field-assist bonding said electrode to said body; then (b) baking said body with said electrode fixed thereto at a temperature in excess of 156 degrees Centigrade.

6. A method as defined in claim 5 including the step of coating said electrode with metal.

7. A ring laser gyroscope manufactured by the process of claim 6.

* * * * *